(12) United States Patent
Lee et al.

(10) Patent No.: US 12,266,478 B2
(45) Date of Patent: Apr. 1, 2025

(54) MULTILAYER ELECTRONIC COMPONENT

(71) Applicant: SAMSUNG ELECTRO-MECHANICS CO., LTD., Suwon-si (KR)

(72) Inventors: Kangha Lee, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 204 days.

(21) Appl. No.: 17/940,251

(22) Filed: Sep. 8, 2022

(65) Prior Publication Data

US 2023/0253157 A1 Aug. 10, 2023

(30) Foreign Application Priority Data

Feb. 9, 2022 (KR) ........................ 10-2022-0017046

(51) Int. Cl.
*H01G 4/232* (2006.01)
*H01G 4/012* (2006.01)
*H01G 4/30* (2006.01)

(52) U.S. Cl.
CPC ........... *H01G 4/2325* (2013.01); *H01G 4/012* (2013.01); *H01G 4/30* (2013.01)

(58) Field of Classification Search
CPC .......... H01G 4/30; H01G 2/065; H01G 4/008; H01G 4/012; H01G 4/12; H01G 4/232
See application file for complete search history.

(56) References Cited

U.S. PATENT DOCUMENTS

| | | | |
|---|---|---|---|
| 2013/0020913 A1* | 1/2013 | Shirakawa | H01G 4/232 336/200 |
| 2013/0057112 A1* | 3/2013 | Shirakawa | H01G 4/12 336/200 |
| 2015/0084481 A1* | 3/2015 | Mori | H01G 4/252 29/829 |

(Continued)

FOREIGN PATENT DOCUMENTS

| | | |
|---|---|---|
| KR | 10-2017-0084156 A | 7/2017 |
| KR | 10-2017-0113108 A | 10/2017 |
| KR | 10-2017-0143275 A | 12/2017 |

*Primary Examiner* — Michael P McFadden
(74) *Attorney, Agent, or Firm* — Morgan, Lewis & Bockius LLP

(57) ABSTRACT

A multilayer electronic component includes a body including a plurality of dielectric layers and first and second internal electrodes disposed alternately with the dielectric layers in a first direction; a first external electrode including a first connection electrode, disposed on the third surface, and a first band electrode disposed on the first surface to be connected to the first connection electrode; a second external electrode including a second connection electrode, disposed on the fourth surface, and a second band electrode disposed on the first surface to be connected to the second connection electrode; a first insulating layer disposed on the first connection electrode; a second insulating layer disposed on the second connection electrode; a first plating layer disposed on the first band electrode; and a second plating layer disposed on the second band electrode, The first and second band electrodes include a conductive metal and a resin.

18 Claims, 20 Drawing Sheets

(56) References Cited

U.S. PATENT DOCUMENTS

| | | | |
|---|---|---|---|
| 2015/0287532 A1* | 10/2015 | Abe | H05K 3/3436 |
| | | | 427/79 |
| 2016/0276104 A1* | 9/2016 | Nishisaka | H01G 4/2325 |
| 2016/0284471 A1* | 9/2016 | Mizuno | H01G 4/1227 |
| 2017/0256359 A1* | 9/2017 | Masunari | H01G 4/005 |
| 2017/0271081 A1 | 9/2017 | Maki et al. | |
| 2017/0278634 A1 | 9/2017 | Kato | |
| 2017/0367187 A1 | 12/2017 | Chae et al. | |
| 2018/0144868 A1* | 5/2018 | Park | H01G 4/30 |
| 2019/0103224 A1* | 4/2019 | Han | H01G 4/2325 |

* cited by examiner

MULTILAYER ELECTRONIC COMPONENT

CROSS-REFERENCE TO RELATED APPLICATION(S)

This application claims benefit of priority to Korean Patent Application No. 10-2022-0017046 filed on Feb. 9, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a type of multilayer electronic component, is a chip-type condenser mounted on the printed circuit boards of various types of electronic products such as an image display device, for example, a liquid crystal display (LCD), a plasma display panel (PDP) or the like, computers, smartphones, and mobile phones, to serve to charge or discharge electricity therein or therefrom.

Such a multilayer ceramic capacitor may be used as a component of various electronic devices due to having a relatively small size, relatively high capacitance, and relative ease of mounting. As various electronic devices such as computers, mobile devices, and the like are miniaturized and have high output, demand for decreasing the size and increasing the capacitance of multilayer ceramic capacitors is increasing. To decrease the size and increase the capacitance of the multilayer ceramic capacitor, it is necessary to mount as many components as possible within a limited area of the substrate. To this end, it is necessary to significantly reduce a mounting space.

With a recent development of wearable devices in the field of information technology (IT), it is becoming important to guarantee bending strength. Accordingly, there is a need for an MLCC having a novel structure which may implement maximum capacitance within a limited volume to stably drive IT devices and may secure bending strength.

SUMMARY

An aspect of the present disclosure is to provide a multilayer electronic component having improved bending strength.

Another aspect of the present disclosure is to provide a multilayer electronic component having improved capacitance per unit volume.

Another aspect of the present disclosure is to provide a multilayer electronic component, capable of significantly reducing a mounting space.

Another aspect of the present disclosure is to provide a multilayer electronic component, capable of significantly reducing equivalent series resistance (ESR).

Another aspect of the present disclosure is to provide a multilayer electronic component, capable of significantly reducing acoustic noise.

However, the present disclosure is not limited thereto, and may be more easily understood in a process of describing exemplary embodiments in the present disclosure.

According to another aspect of the present disclosure, a multilayer electronic component includes a body including a plurality of dielectric layers and first and second internal electrodes disposed alternately with the dielectric layers in a first direction and having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode including a first connection electrode, disposed on the third surface, and a first band electrode disposed on the first surface to be connected to the first connection electrode; a second external electrode including a second connection electrode, disposed on the fourth surface, and a second band electrode disposed on the first surface to be connected to the second connection electrode; a first insulating layer disposed on the first connection electrode; a second insulating layer disposed on the second connection electrode; a first plating layer disposed on the first band electrode; and a second plating layer disposed on the second band electrode. The first and second band electrodes include a conductive metal and a resin.

According to another aspect of the present disclosure, a multilayer electronic component includes: a body including a plurality of dielectric layers and first and second internal electrodes disposed alternately with the dielectric layers in a first direction and having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode including a first connection electrode, disposed on the third surface, and a first band electrode disposed on the first surface to be connected to the first connection electrode; a second external electrode including a second connection electrode, disposed on the fourth surface, and a second band electrode disposed on the first surface to be connected to the second connection electrode; a first plating layer disposed on the first external electrode; and a second plating layer disposed on the second external electrode. The first and second band electrodes include a conductive metal and a resin.

BRIEF DESCRIPTION OF DRAWINGS

The above and other aspects, features, and advantages of the present disclosure will be more clearly understood from the following detailed description, taken in conjunction with the accompanying drawings

DETAILED DESCRIPTION

Figure 1:
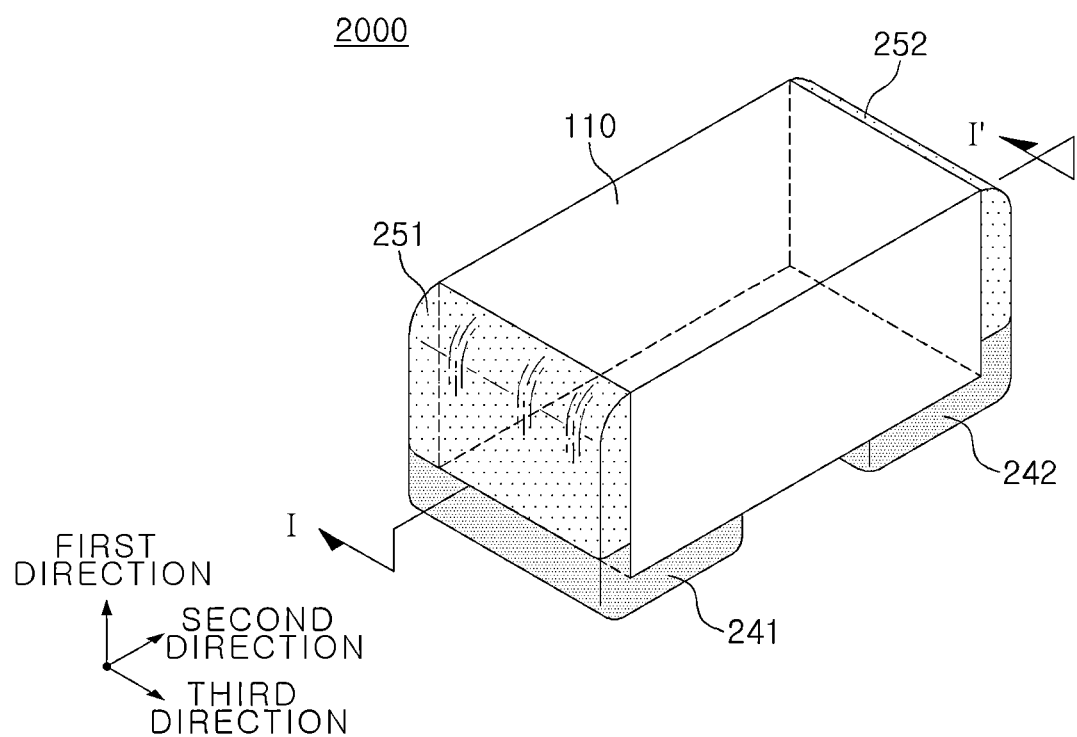
FIG. 1 is a schematic perspective view of a multilayer electronic component according to an exemplary embodiment in the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

The term "an exemplary embodiment" used herein does not refer to the same exemplary embodiment, and is provided to emphasize a particular feature different from that of another exemplary embodiment. However, exemplary embodiments provided herein may be implemented by being combined in whole or in part one with one another. For example, one element described in a particular exemplary embodiment may be understood as a description related to another exemplary embodiment even if it is not described in another exemplary embodiment, unless an opposite or contradictory description is provided therein.

In the drawings, a first direction may be defined as a stacking direction or a thickness (T) direction, a second direction may be defined as a length (L) direction, and a third direction may be defined as a width (W) direction.

FIG. 1 is a schematic perspective view of a multilayer electronic component according to an exemplary embodiment in the present disclosure.

Figure 2:
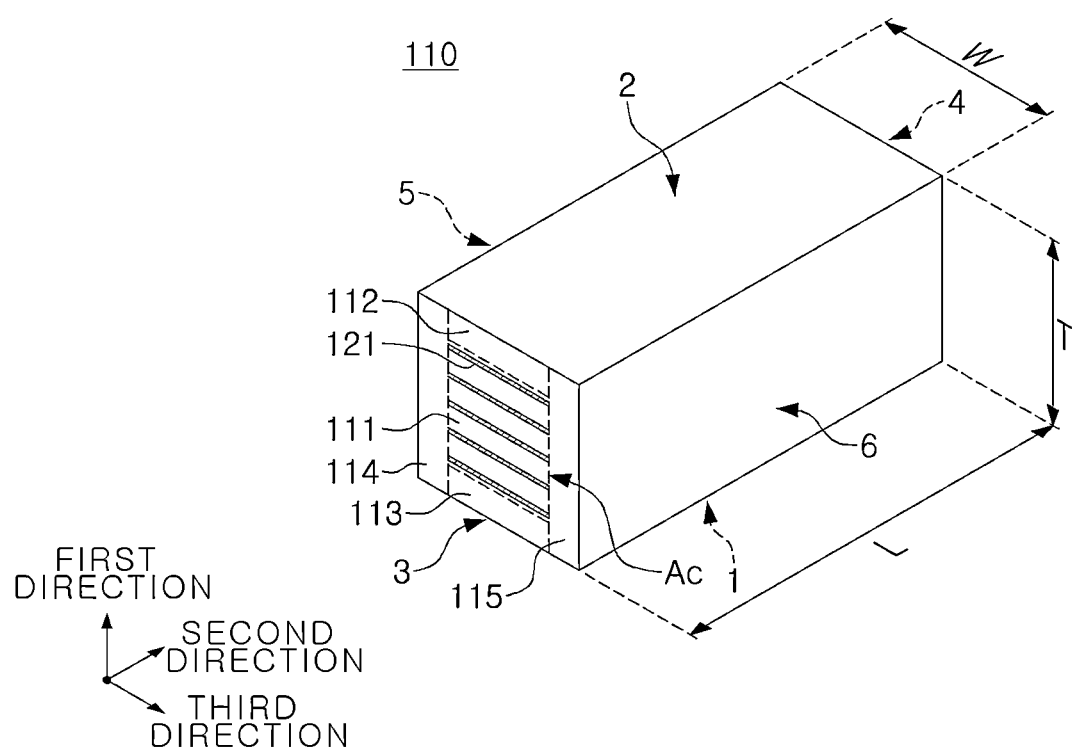
FIG. 2 is a schematic perspective view of a body of the multilayer electronic component of FIG. 1.

FIG. 2 is a schematic perspective view of a body of the multilayer electronic component of FIG. 1.

Figure 3:
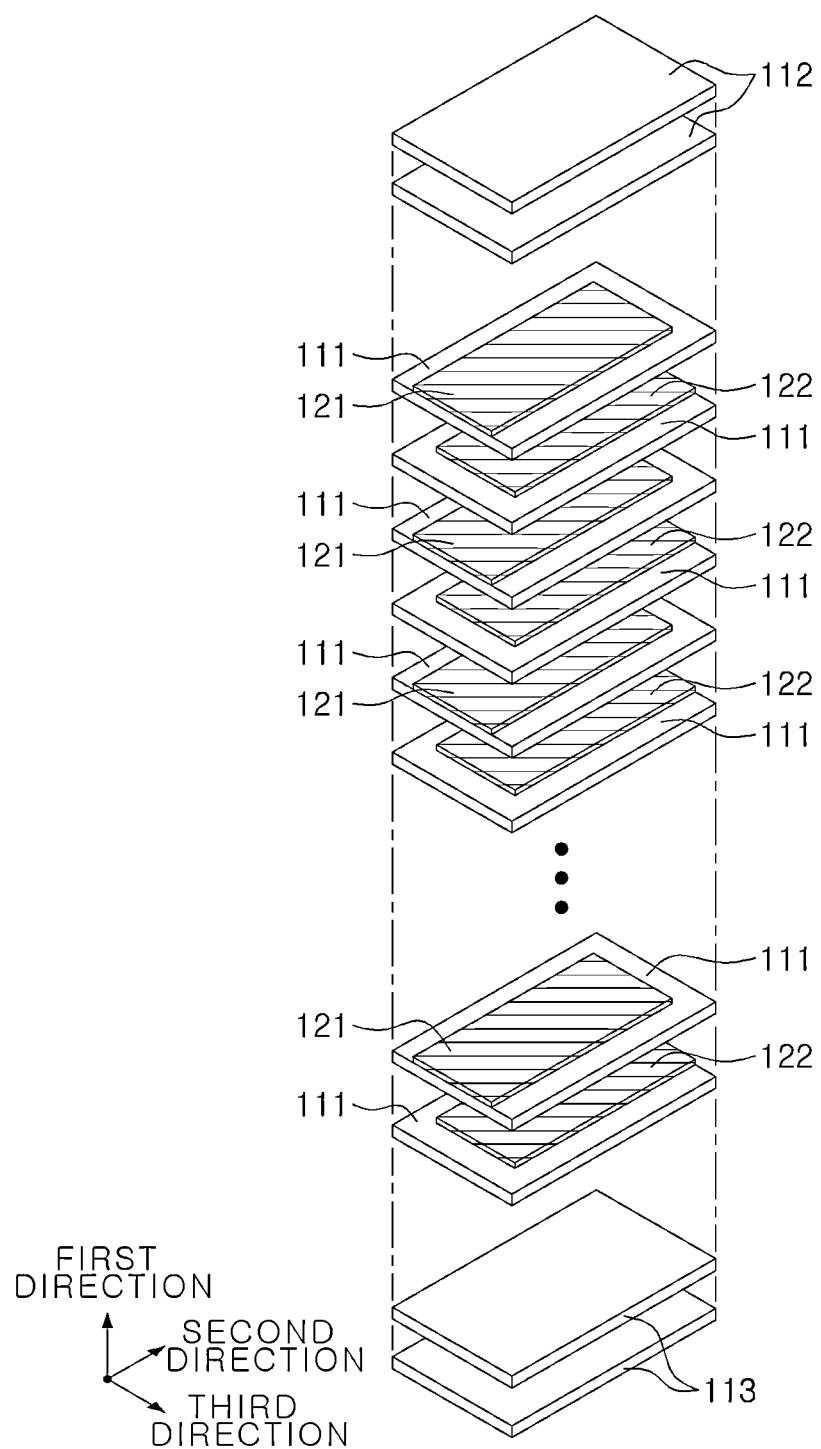
FIG. 3 is an exploded perspective view of the body of FIG. 2.

FIG. 3 is an exploded perspective view of the body of FIG. 2.

Figure 4:
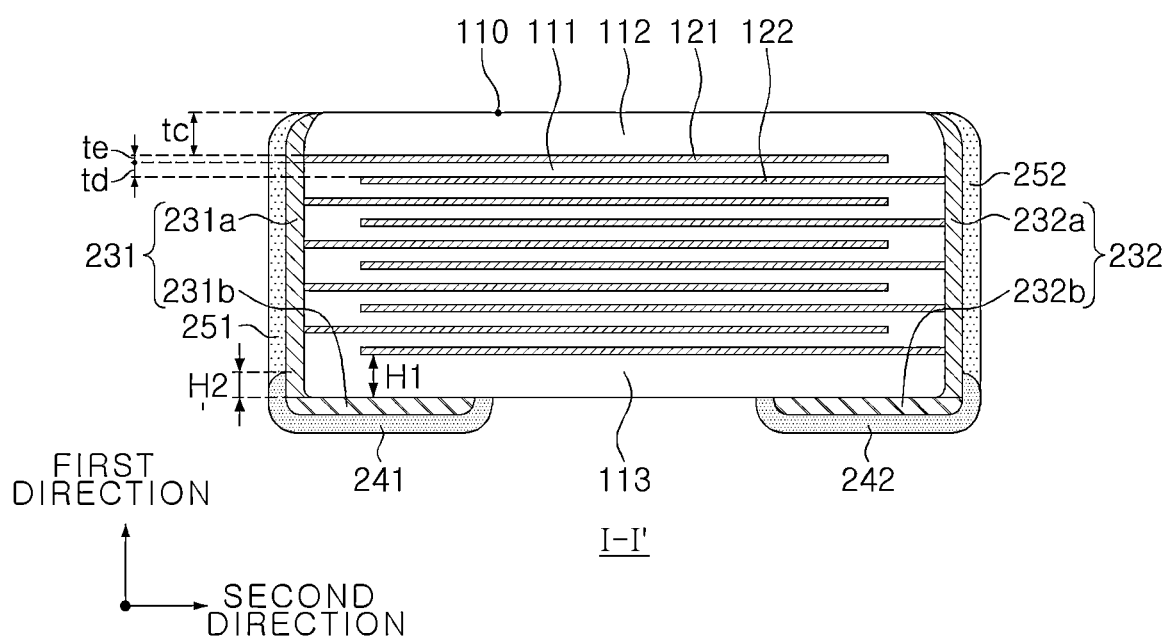
FIG. 4 is a cross-sectional view taken along line I-I' of FIG. 1.

FIG. 4 is a cross-sectional view taken along line I-I' of FIG. 1.

Figure 5:
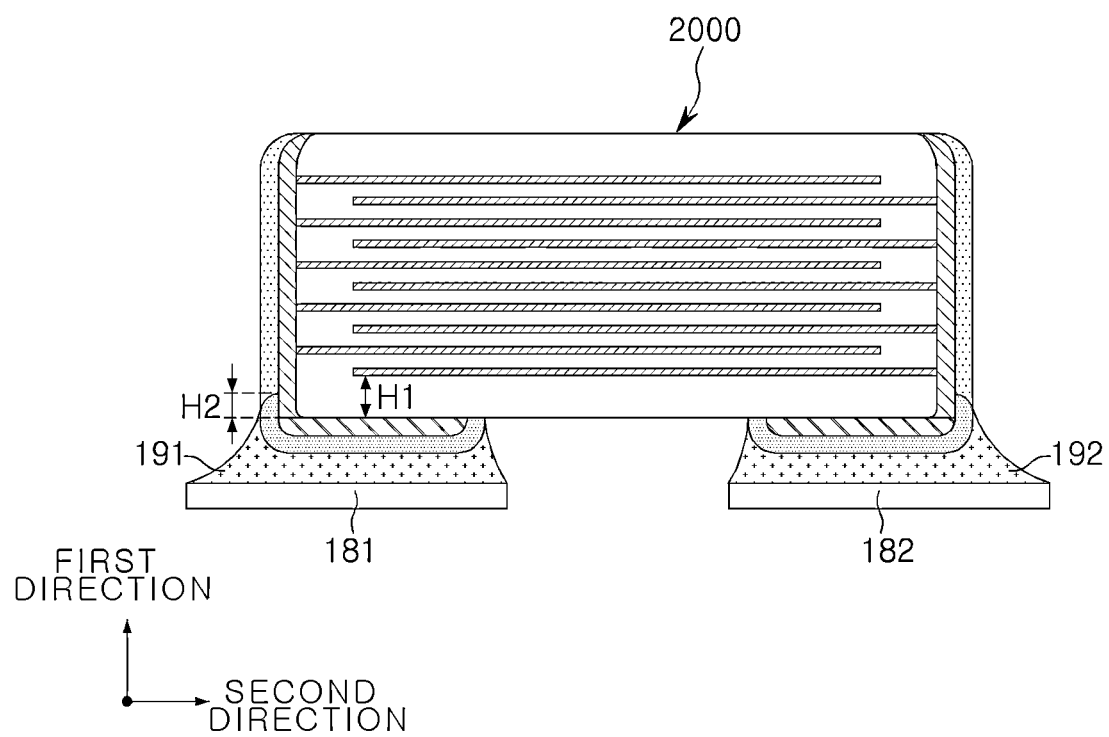
FIG. 5 is a schematic cross-sectional view of a multilayer electronic component of FIG. 4 to which a solder and an electrode pad are added.

FIG. 5 is a schematic cross-sectional view of a multilayer electronic component of FIG. 4 to which a solder and an electrode pad are added.

Figure 6:
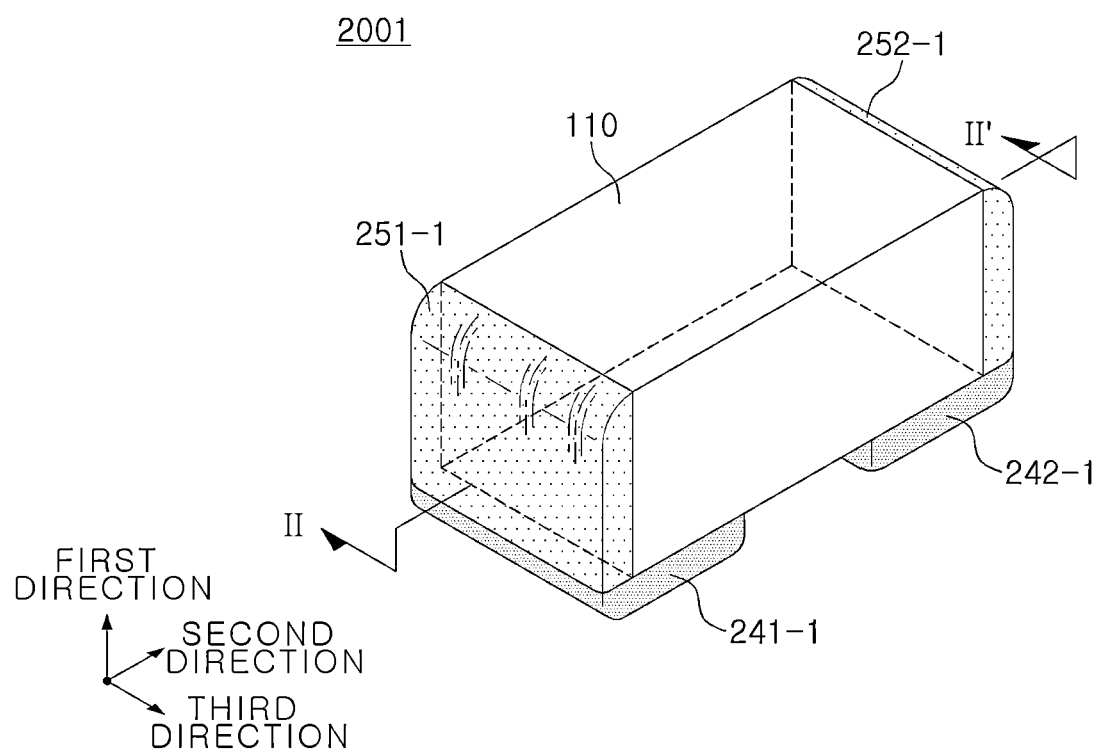
FIG. 6 is a schematic perspective view of a multilayer electronic component according to an exemplary embodiment in the present disclosure.

FIG. 6 is a schematic perspective view of a multilayer electronic component according to an exemplary embodiment in the present disclosure.

Figure 7:
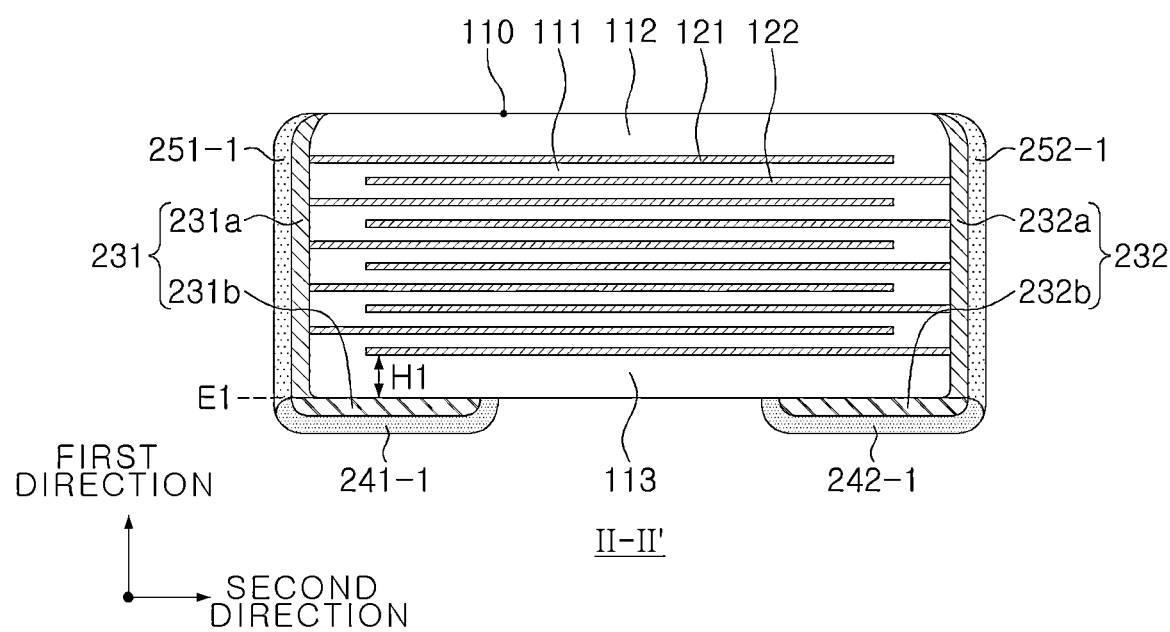
FIG. 7 is a cross-sectional view taken along line II-II' of FIG. 6.

FIG. 7 is a cross-sectional view taken along line II-II' of FIG. 6.

Figure 8:
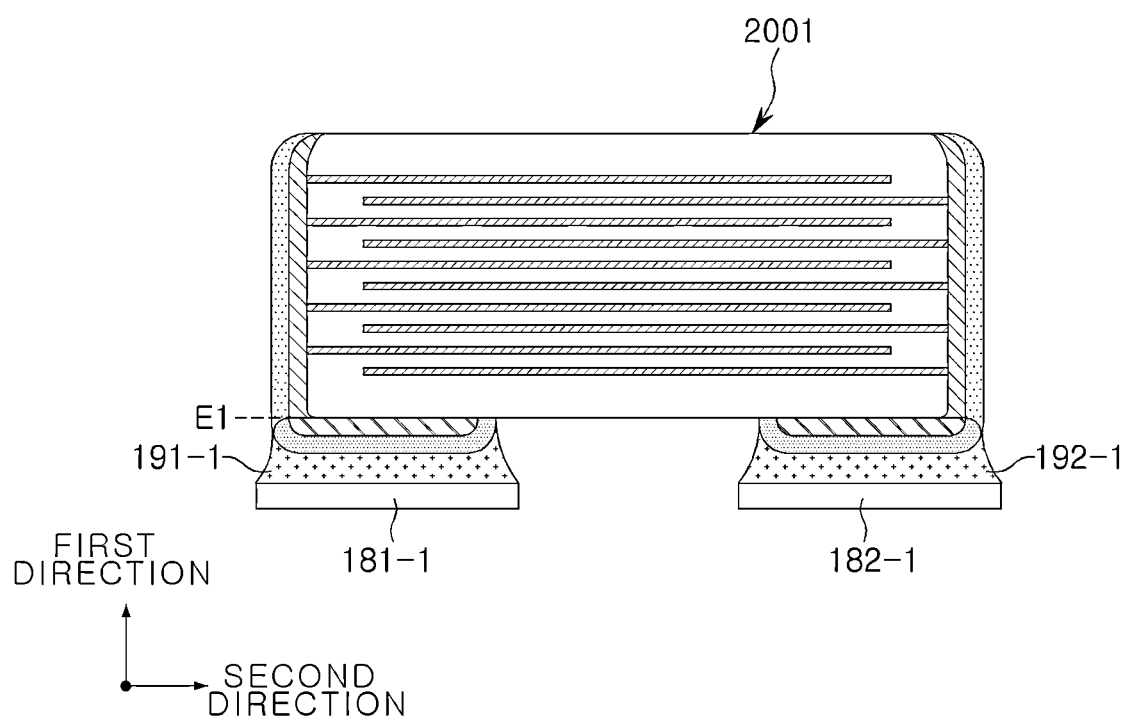
FIG. 8 is a schematic cross-sectional view of a multilayer electronic component of FIG. 7 to which a solder and an electrode pad are added.

FIG. 8 is a schematic cross-sectional view of a multilayer electronic component of FIG. 7 to which a solder and an electrode pad are added.

Figure 9:
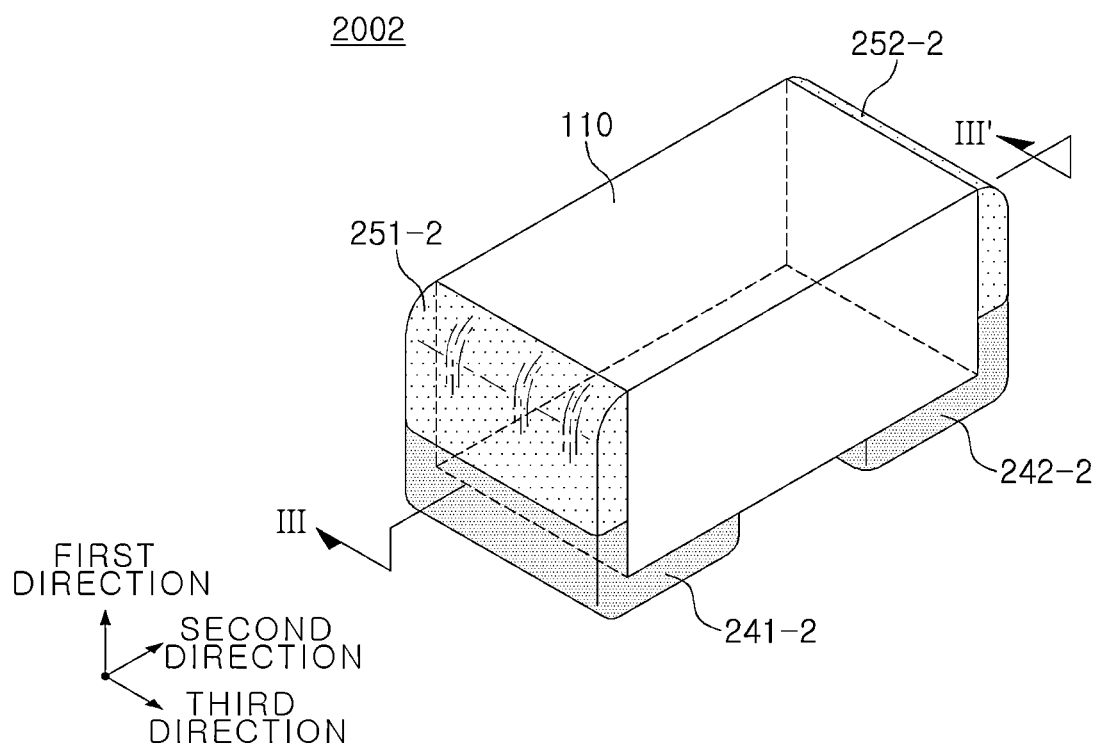
FIG. 9 is a schematic perspective view of a multilayer electronic component according to an exemplary embodiment in the present disclosure.

FIG. 9 is a schematic perspective view of a multilayer electronic component according to an exemplary embodiment in the present disclosure.

Figure 10:
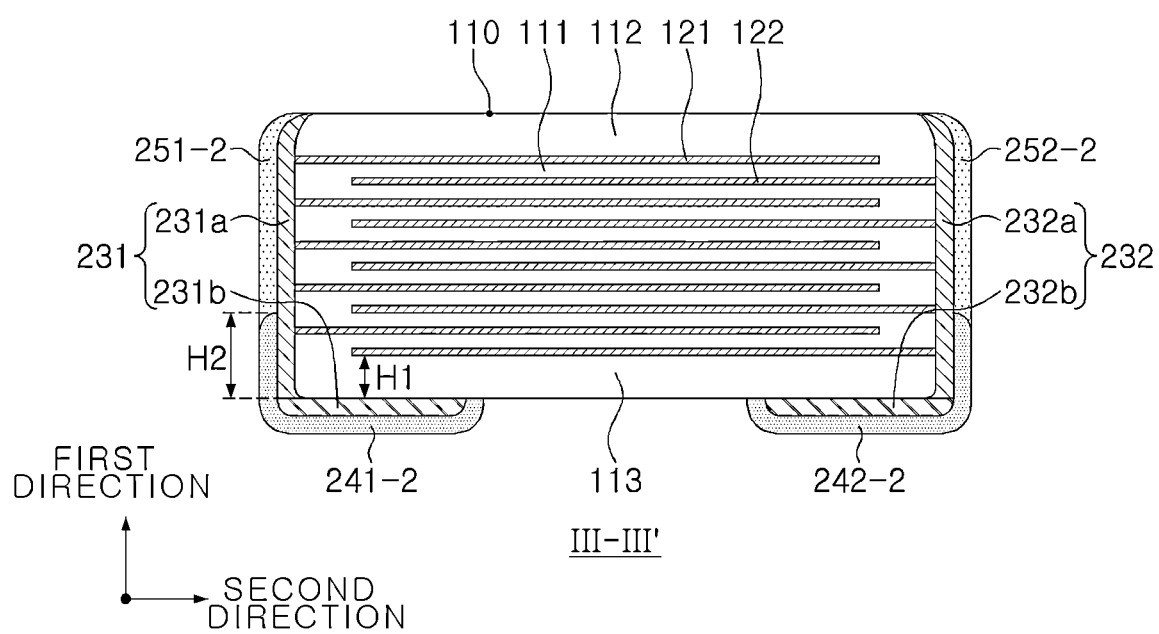
FIG. 10 is a cross-sectional view taken along line III-III' of FIG. 9.

FIG. 10 is a cross-sectional view taken along line III-III' of FIG. 9.

Figure 11:
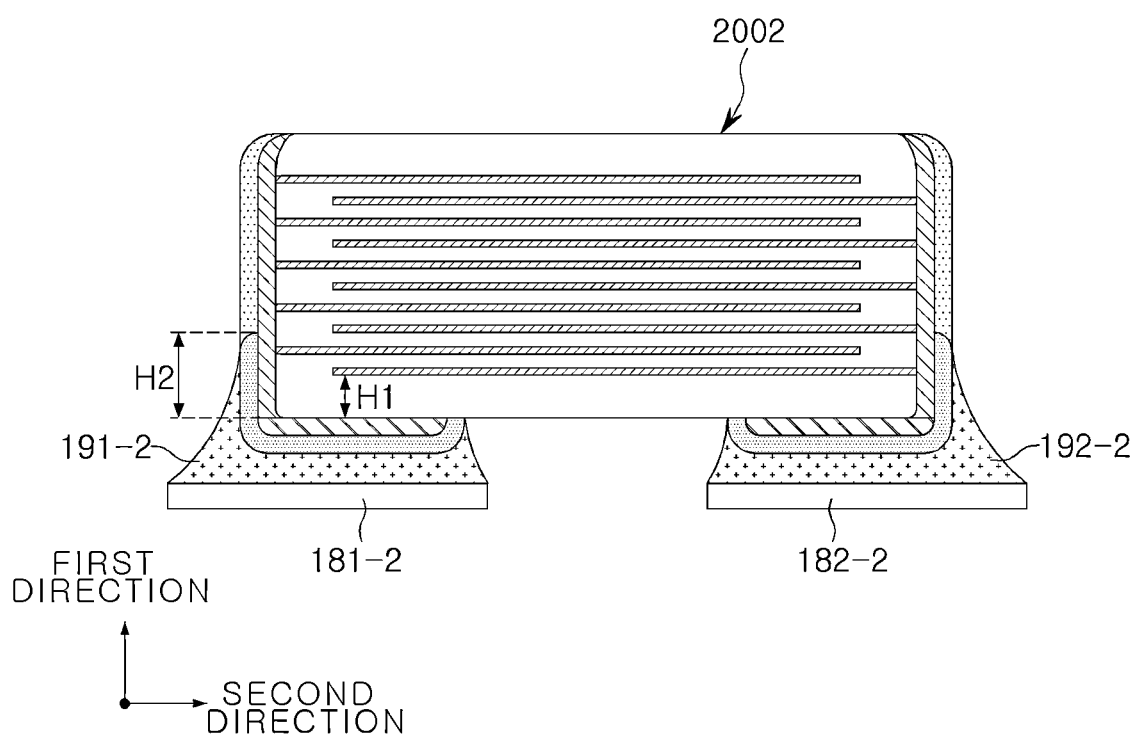
FIG. 11 is a schematic cross-sectional view of a multilayer electronic component of FIG. 10 to which a solder and an electrode pad are added.

FIG. 11 is a schematic cross-sectional view of a multilayer electronic component of FIG. 10 to which a solder and an electrode pad are added.

Figure 12:
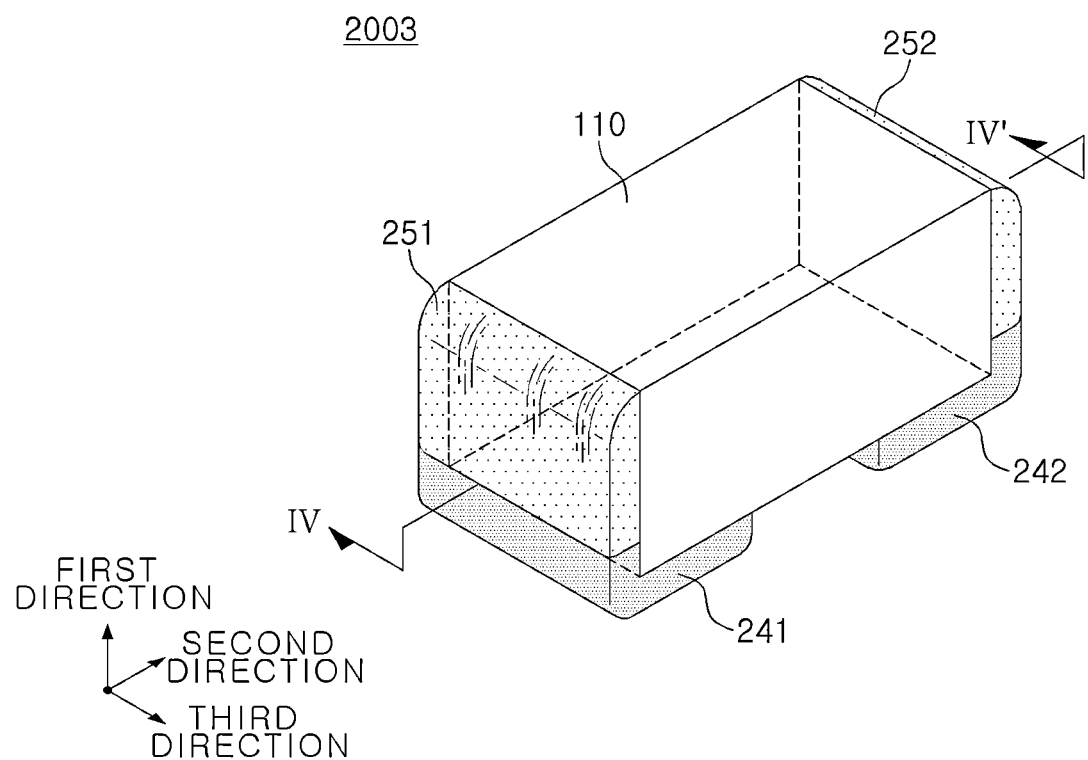
FIG. 12 is a schematic perspective view of a multilayer electronic component according to an exemplary embodiment in the present disclosure.

FIG. 12 is a schematic perspective view of a multilayer electronic component according to an exemplary embodiment in the present disclosure.

Figure 13:
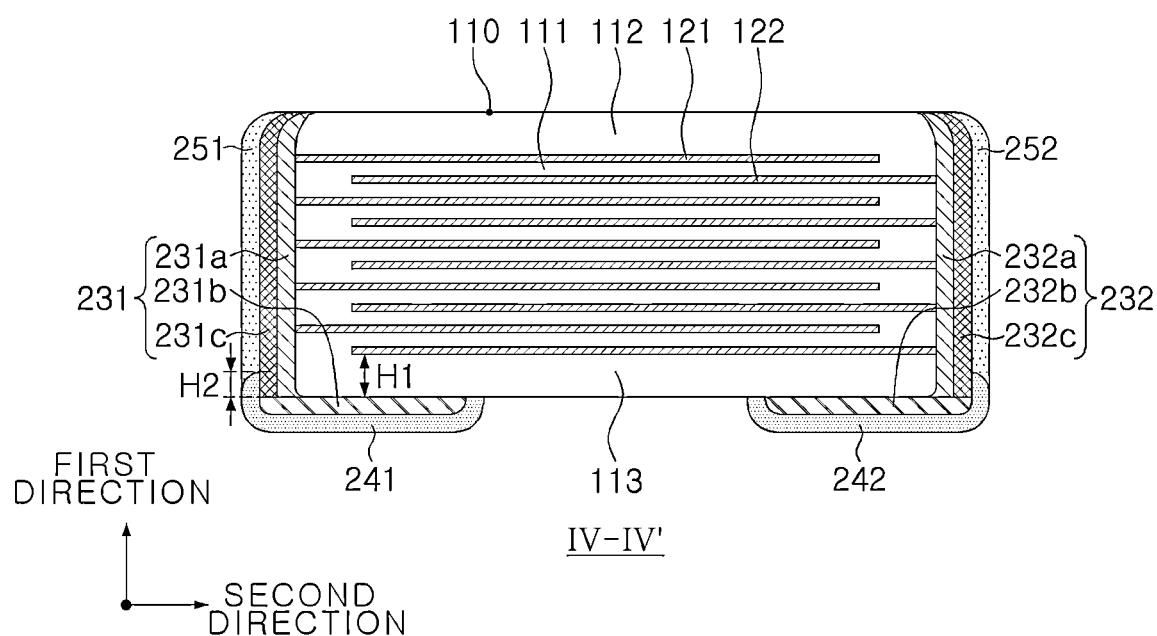
FIG. 13 is a cross-sectional view taken along line IV-IV' of FIG. 12.

FIG. 13 is a cross-sectional view taken along line IV-IV' of FIG. 12.

Figure 14:
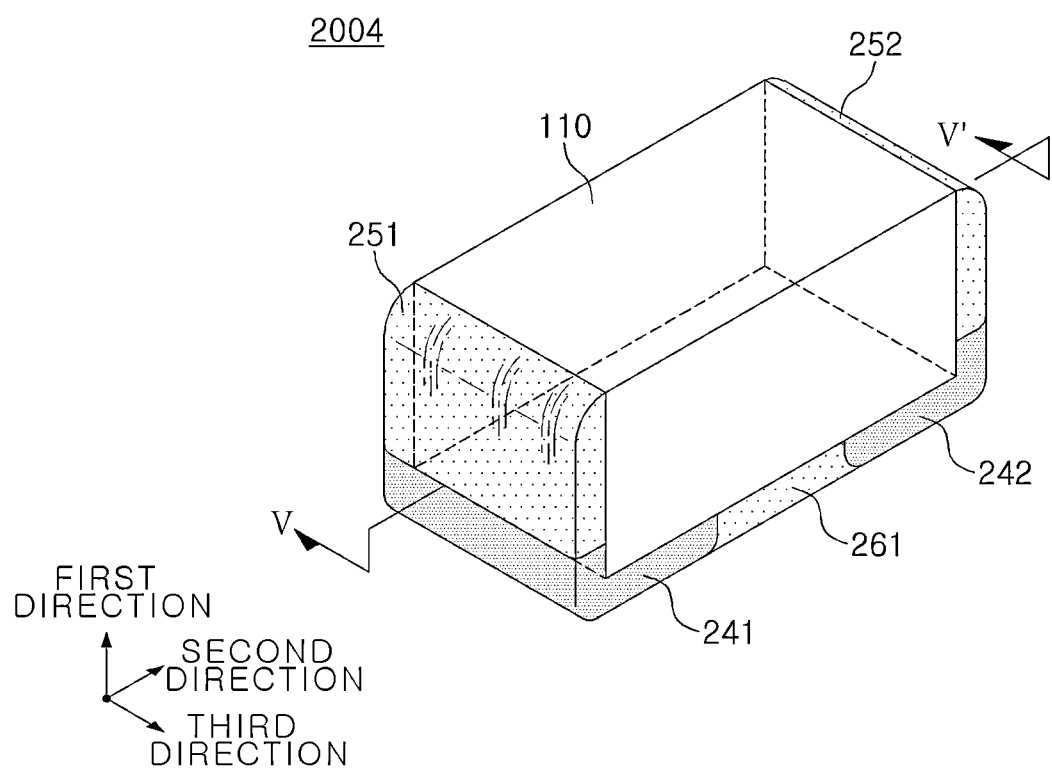
FIG. 14 is a schematic perspective view of a multilayer electronic component according to an exemplary embodiment in the present disclosure.

FIG. 14 is a schematic perspective view of a multilayer electronic component according to an exemplary embodiment in the present disclosure.

Figure 15:
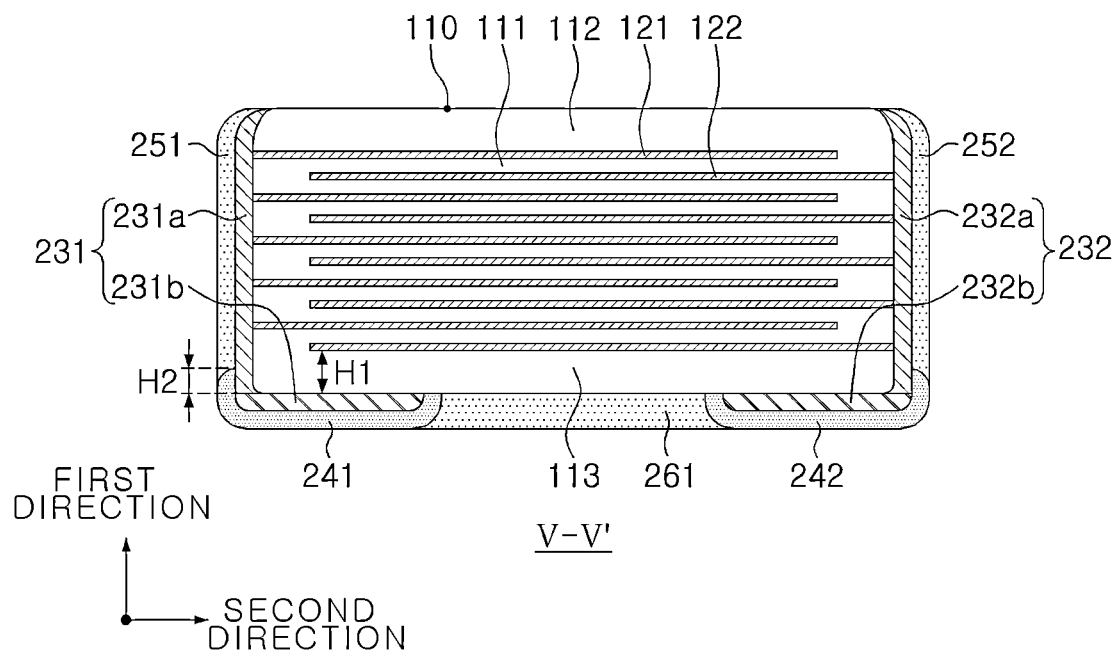
FIG. 15 is a cross-sectional view taken along line V-V' of FIG. 14.

FIG. 15 is a cross-sectional view taken along line V-V' of FIG. 14.

Figure 16:
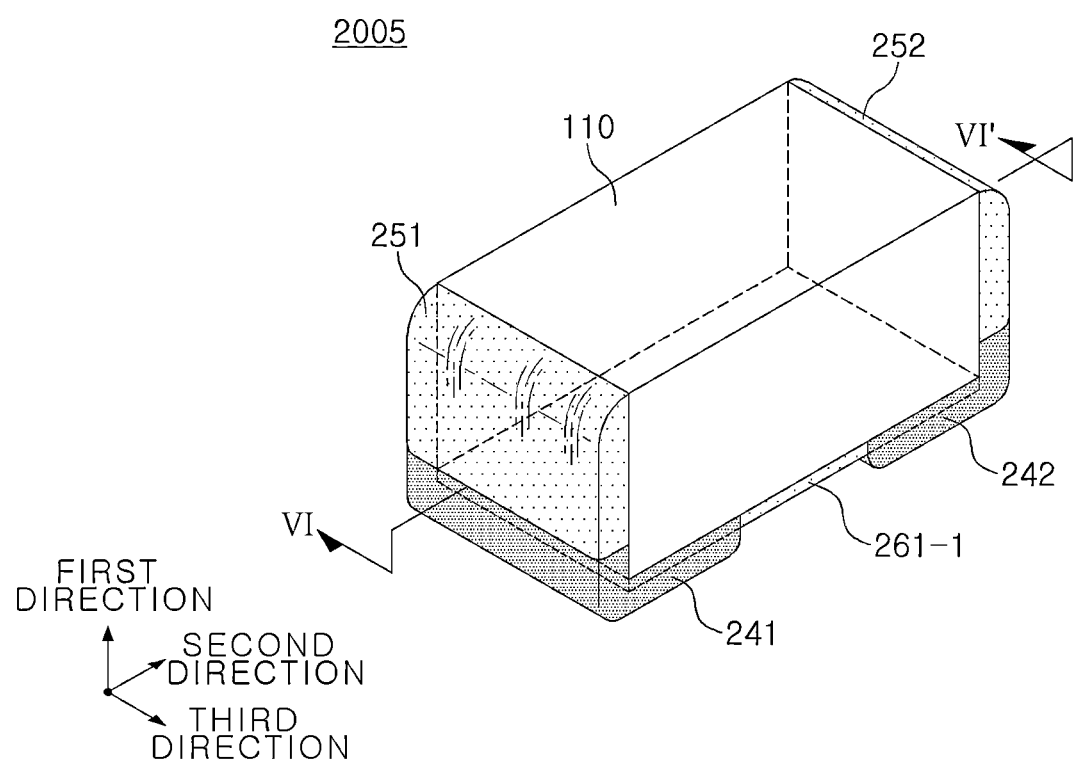
FIG. 16 is a schematic perspective view of a multilayer electronic component according to an exemplary embodiment in the present disclosure.

FIG. 16 is a schematic perspective view of a multilayer electronic component according to an exemplary embodiment in the present disclosure.

Figure 17:
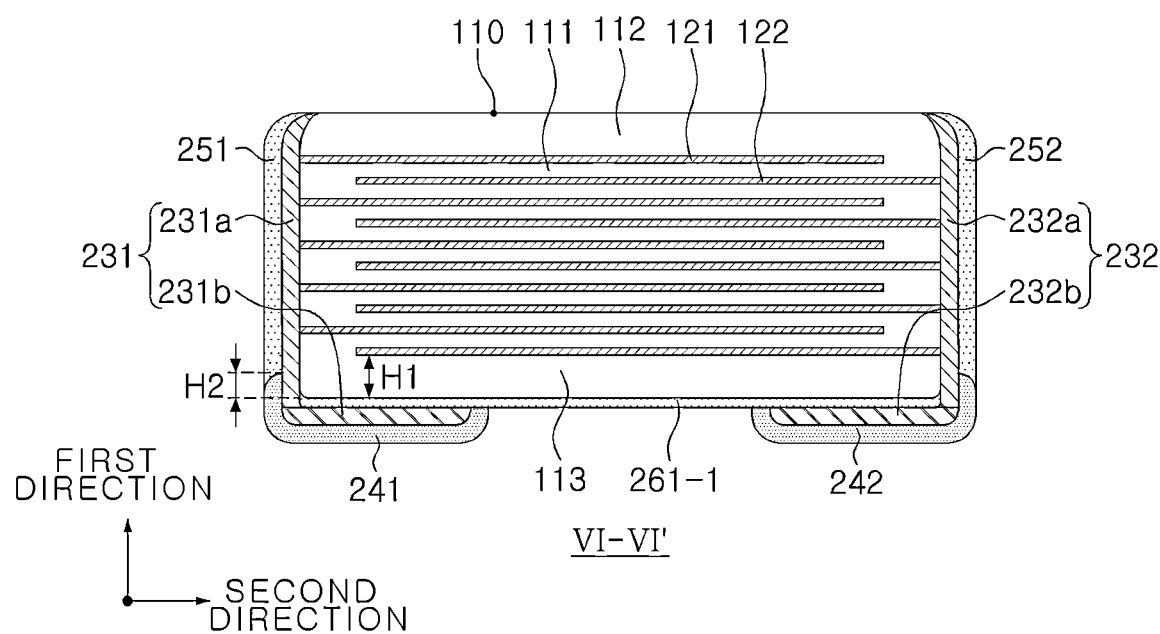
FIG. 17 is a cross-sectional view taken along line VI-VI' of FIG. 16.

FIG. 17 is a cross-sectional view taken along line VI-VI' of FIG. 16.

Figure 18:
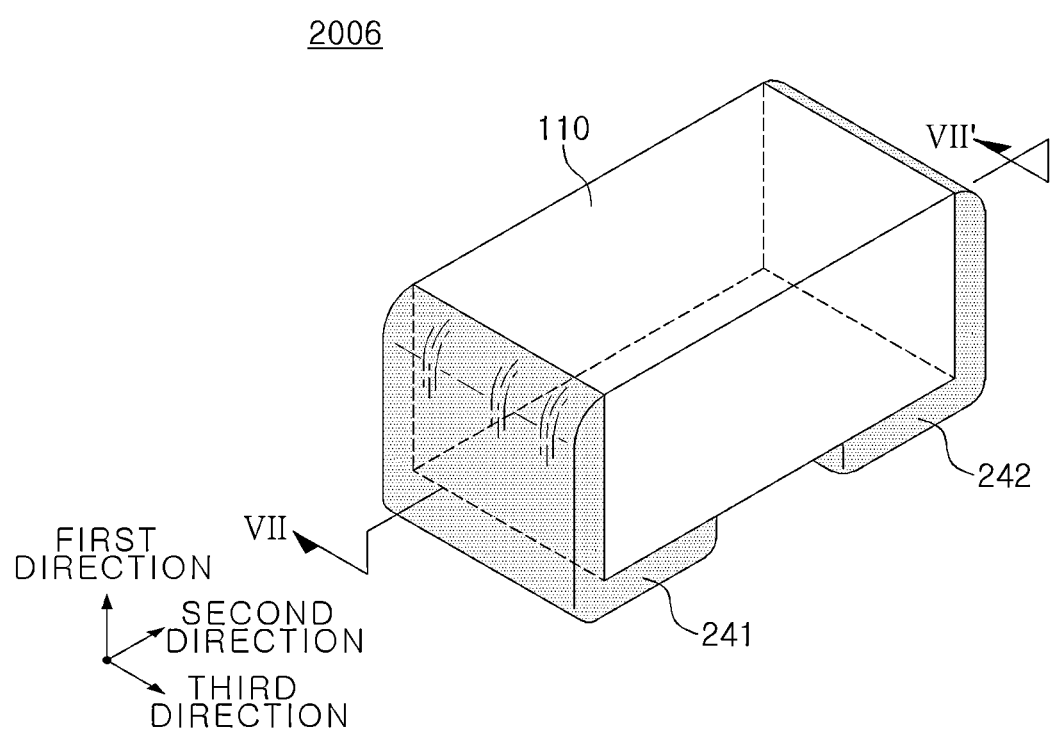
FIG. 18 is a schematic perspective view of a multilayer electronic component according to an exemplary embodiment in the present disclosure.

FIG. 18 is a schematic perspective view of a multilayer electronic component according to an exemplary embodiment in the present disclosure.

Figure 19:
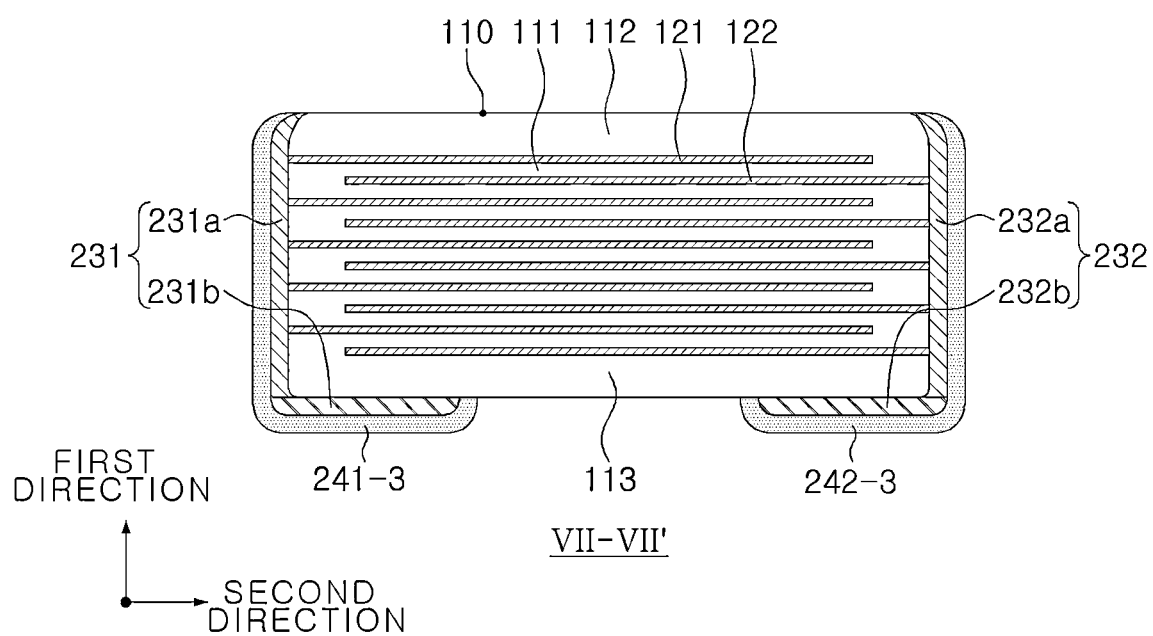
FIG. 19 is a cross-sectional view taken along line VII-VII' of FIG. 18.

FIG. 19 is a cross-sectional view taken along line VII-VII' of FIG. 18.

Figure 20:
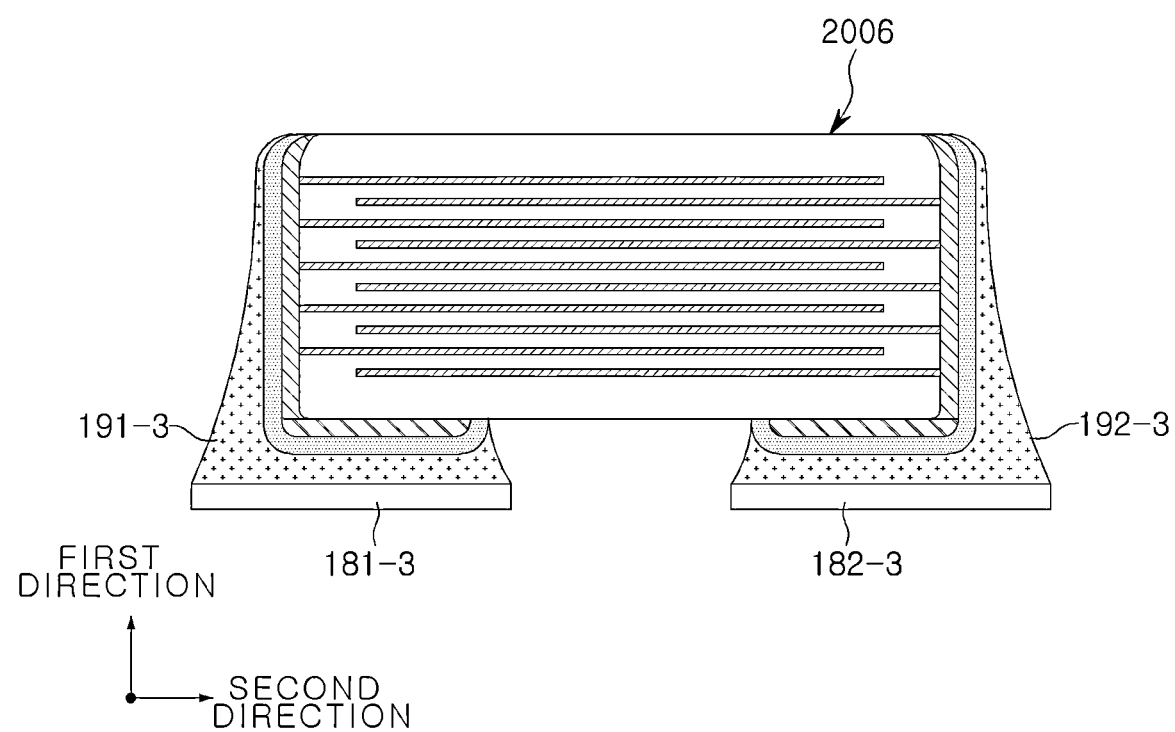
FIG. 20 is a schematic cross-sectional view of a multilayer electronic component of FIG. 19 to which a solder and an electrode pad are added.

FIG. 20 is a schematic cross-sectional view of a multilayer electronic component of FIG. 19 to which a solder and an electrode pad are added.

Hereinafter, a multilayer electronic component 2000 according to an exemplary embodiment will be described with reference to FIGS. 1 to 5.

The multilayer electronic component 2000 according to an exemplary embodiment may include a body including a plurality of dielectric layers 111 and first and second internal electrodes 121 and 122 disposed alternately with the dielectric layers 111 in a first direction and having first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction, a first external electrode 231 including a first connection electrode 231a disposed on the third surface 3 and a first band electrode 231b disposed on the first surface 1 to be connected to the first connection electrode 231a, a second external electrode 232 including a second connection electrode 232a disposed on the fourth surface 4 and a second band electrode 232b disposed on the second surface to be connected to the second connection electrode 232a, a first insulating layer 251 disposed on the first connection electrode 231a, a second insulating layer 252 disposed on the second connection electrode 232a, a first plating layer 241 disposed on the first band electrode 231b, and a second plating layer 242 disposed on the second band electrode 232b. The first and second band electrodes 231b and 232b may include a conductive metal and a resin.

In the body 110, the dielectric layers 111 and the internal electrodes 121 and 122 may be alternately laminated.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powder particles included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

The plurality of dielectric layers 111 constituting the body 110 may be in a sintered state, and adjacent dielectric layers 111 may be integrated with each other such that boundaries therebetween are not readily apparent without using a scanning electron microscope (SEM).

A material of the dielectric layer 111 may not be limited to any particular material as long as sufficient capacitance is able to be obtained therewith. For example, as the material, a barium titanate material, a perovskite material compound with lead (Pb), a strontium titanate material, or the like, may be used. The barium titanate material may include $BaTiO_3$-based ceramic powder particles, and an example of the ceramic powder particles may include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, $Ba(Ti_{1-y}Zr_y)O_3$ $(0<y<1)$, or the like, in which calcium (Ca), zirconium (Zr), and the like, are partially solid-solute in $BaTiO_3$, or the like.

As the material of the dielectric layer 111, various ceramic additives, organic solvents, plasticizers, coupling agents, dispersants, and the like, may be added to powder particles such as barium titanate ($BaTiO_3$) powder particles, or the like, depending on an intended purpose.

An average thickness td of the dielectric layer 111 does not need to be limited.

In general, when the dielectric layer 111 is formed to have a low thickness of less than 0.6 μm, in particular, when the dielectric layer 111 is formed to have a thickness of less than 0.35 μm, reliability may be deteriorated.

According to an exemplary embodiment, the insulating layers 251 and 252 may be disposed on the connection electrodes 231a and 232a of the external electrodes 231 and 232, and the plating layers 241 and 242 may be disposed on the band electrodes 231b and 232b of the external electrodes 231 and 232, so that permeation of external moisture, permeation of a plating solution, or the like, may be prevented to improve reliability. Therefore, even when the average thickness of the dielectric layer 111 is 0.35 μm or less, improved reliability may be secured.

The average thickness td of the dielectric layer 111 may refer to an average thickness of the dielectric layer 111 disposed between the first and second internal electrodes 121 and 122.

An average thickness td of the dielectric layer 111 may be measured by scanning the cross-sections in the first and second directions (length and thickness directions, an L-T plane) of the body 110 with a scanning electron microscope (SEM) with a magnification of 10,000. For example, an average value thereof may be determined by measuring a thickness of a single dielectric layer at thirty (30) equally spaced points in the length direction in the scanned image. The thirty (30) equally spaced points may be designated in an active portion Ac. In addition, when such an average value is determined using measurements of average values to ten (10) dielectric layers, the average thickness td of the dielectric layer 111 may be more generalized.

The body 110 may include an active portion Ac disposed in the body 110 and including the first internal electrode 121 and the second internal electrode 122, disposed to oppose each other with the dielectric layer 111 interposed therebetween to form capacitance, and cover portions 112 and 113 disposed above and below the active portion Ac in the first direction.

The active portion Ac may be a portion contributing to capacitance formation of the multilayer electronic component, and may be formed by repeatedly laminating the plurality of first and second internal electrodes 121 and 122 with the dielectric layer 111 interposed therebetween.

The cover portions 112 and 113 may include an upper cover portion 112, disposed above the active portion Ac in the first direction, and a lower cover portion 113 disposed below the active portion Ac in the first direction.

The upper cover portion 112 and the lower cover portion 113 may be formed by laminating a single dielectric layer or two or more dielectric layers on the upper and lower surfaces of the active portion Ac in the first direction (thickness direction), respectively, and may basically serve to prevent damage to the internal electrode caused by chemical stress.

The upper cover portion 112 and the lower cover portion 113 may not include an internal electrode and may include the same material as the dielectric layer 111. For example, the upper cover portion 112 and the lower cover portion 113 may include a ceramic material, for example, a barium titanate ($BaTiO_3$)-based ceramic material.

An average thickness tc of the cover portions 112 and 113 does not need to be limited. However, the average thickness tc of the cover portions 112 and 113 may be 15 μm or less to more easily achieve miniaturization and high capacitance of the multilayer electronic component. In addition, according to an exemplary embodiment, insulating layers 251 and 252 may be disposed on the connection electrodes 231a and 232a of the external electrodes 231 and 232, and the plating layers 241 and 242 may be formed on the band electrodes 231b and 232b of the external electrodes 231 and 232 to prevent permeation of external moisture penetration, permeation of a plating solution penetration, and/or the like, thereby improving reliability. Therefore, even when the average thickness tc of the cover portions 112 and 113 is 15 μm or less, improved reliability may be secured.

The average thickness tc of the cover portions 112 and 113 may refer to an average size in the first direction, and may be an average of values measured at five (5) equally spaced points above or below the active portions Ac in the first direction.

The margin portions 114 and 115 may be disposed on opposite end surfaces of the active portion Ac in the third direction.

The margin portions 114 and 115 may include a first margin portion 114, disposed on the fifth surface 5 of the body 110, and a second margin portion 115 disposed on the sixth surface 6 of the body 110. For example, the margin portions 114 and 115 may be disposed on opposite end surfaces of the ceramic body 110 in the third direction (the width direction).

As illustrated in FIG. 2, the margin portions 114 and 115 may refer to regions between both side surfaces of the first and second internal electrodes 121 and 122, and an external surface of the body 110, in a cross-section of the body 110 cut in the first and third directions (the thickness and width directions, W-T direction) and a boundary surface of the body 110.

The margin portions 114 and 115 may basically play a role in preventing damage to the internal electrodes caused by physical or chemical stress.

The margin portions 114 and 115 may be formed by forming the internal electrodes 121 and 122 by applying a conductive paste on the ceramic green sheet, except for a portion in which the margin portions 114 and 115 are to be formed.

To suppress the step difference caused by the internal electrodes 121 and 122, the internal electrodes 121 and 122 may be cut to be exposed to the fifth and sixth surfaces 5 and 6 of the body 110 after lamination. Then, the margin portions 114 and 115 may be formed by laminating a single dielectric layer 111 or two or more dielectric layers 111 on opposite side surfaces of the active portion Ac in the third direction (the width direction).

The average width of the margin portions 114 and 115 does not need to be limited. However, the average width of the margin portions 114 and 115 may be 15 μm or less to more easily achieve miniaturization and high capacitance of the multilayer electronic component. In addition, according to an exemplary embodiment, insulating layers 251 and 252 may be disposed on the connection electrodes 231a and 231a of the external electrodes 231 and 232, and the plating layers 241 and 242 may be formed on the band electrodes 231b and 232b of the external electrodes 231 and 232 to prevent permeation of external moisture penetration, permeation of a plating solution penetration, and/or the like, thereby improving reliability. Therefore, even when the average width of the margin portions 114 and 115 is 15 μm or less, improved reliability may be secured.

The average width of the margin portions 114 and 115 may refer to an average size of the margin portions 114 and 115 in the third direction, and may be an average value of sizes of the margin portions 114 and 115 measured at five equally spaced five points on a side surface of the active portion Ac in the third direction.

The internal electrodes 121 and 122 may be laminated with the dielectric layer 111.

The internal electrodes 121 and 122 may include first and second internal electrodes 121 and 122. The first and second internal electrodes 121 and 122 may be alternately disposed to oppose each other with the dielectric layer 111, constituting the body 110, interposed therebetween, and may be exposed to the third and fourth surfaces 3 and 4 of the body 110, respectively.

Referring to FIG. 4, the first internal electrode 121 may be spaced apart from the fourth surface 4 and may be exposed from the third surface 3, and the second internal electrode 122 may be spaced apart from the third surface 3 and may be exposed from the fourth surface 4. The first external electrode 231 may be disposed on the third surface 3 of the body 110 to be connected to the first internal electrode 121, and the second external electrode 232 may be disposed on the fourth surface 4 of the body 110 to be connected to the second internal electrode 122.

For example, the first internal electrode 121 may not be connected to the second external electrode 232 but may be connected to the first external electrode 231, and the second internal electrode 122 may not be connected to the first external electrode 231 but may be connected to the second external electrode 232. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 interposed therebetween.

The body 110 may be formed by alternately laminating a ceramic green sheet, on which the first internal electrode 121 is printed, and a ceramic green sheet, on which the second internal electrode 122 is printed, and then sintering the laminated ceramic green sheets.

A material for forming the internal electrodes 121 and 122 is not limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), or tungsten (W)), titanium (Ti), and alloys thereof.

In addition, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheets. As a printing method of the conductive paste for the internal electrodes, a screen-printing method, a gravure printing method, or the like may be used, but exemplary embodiments are not limited thereto.

An average thicknesses te of the internal electrodes 121 and 122 does not need to be limited.

In general, when an internal electrode is formed as a thin film having a thickness of less than 0.6 μm, in particular, when the thickness of the internal electrode is 0.35 μm or less, reliability may be deteriorated.

However, according to an exemplary embodiment, the insulating layers 251 and 252 may be disposed on the connection electrodes 231a and 232a of the external electrodes 231 and 232, and the plating layers 241 and 232 may be disposed on the band electrodes 231b and 232b of the external electrodes 231 and 232 to prevent permeation of external moisture, permeation of a plating solution, and/or the like, thereby improving reliability. Therefore, even when the average thickness of the internal electrodes 121 and 122 is 0.35 μm or less, improved reliability may be secured.

The average thickness te of each of the internal electrodes 121 and 122 may be measured by scanning the cross-sections in the first and second directions (length and thickness directions, an L-T plane) of the body 110 with a scanning electron microscope (SEM) with a magnification of 10,000. For example, an average value thereof may be determined by measuring a thickness of one (1) internal electrode at thirty (30) equally spaced points in the second direction (the length direction) in the scanned image. The thirty (30) equally spaced points may be designated in the active portion Ac. In addition, when such an average value is determined using measurements of average values to ten (10) internal electrodes, the average thickness to of the internal electrode may be more generalized.

In the exemplary embodiment, a structure in which the ceramic electronic component 2000 has two external electrodes 231 and 232 has been described. However, the number and shape of the external electrodes 231 and 232 may vary depending on the shape of the internal electrodes 121 and 122 or other purposes. This will be equally applied to ceramic electronic components 2001, 2002, 2003, 2004, 2005, and 2006 described below.

The external electrodes 231 and 232 may be disposed on the third surface 3 and the fourth surface 4 of the body 110. The external electrodes 231 and 232 may include first and second external electrodes 231 and 232, respectively disposed on the third and fourth surfaces 3 and 4 of the body 110 to be connected to the first and second internal electrodes 121 and 122.

The external electrodes 231 and 232 may be formed of any material as long as they have electrical conductivity, such as a metal, and specific materials may be determined in consideration of electrical characteristics, structural stability, or the like, and further may have a multilayer structure.

The external electrodes 231 and 232 may be sintered electrodes including a conductive metal and a glass, or resin-based electrodes including a conductive metal and a resin.

In addition, the external electrodes 231 and 232 may be in a form in which a sintering electrode and a resin-based electrode are sequentially formed on the body 110. In addition, the external electrodes 231 and 232 may be formed by transferring a sheet including a conductive metal onto the body 110 or by transferring a sheet including a conductive metal onto a sintering electrode.

As a conductive metal included in the external electrodes 231 and 232, a material having improved electrical conductivity may be used, and exemplary embodiments are not limited thereto. For example, the conductive metal may be one or more of copper (Cu), nickel (Ni), palladium (Pd), silver (Ag), tin (Sn), chromium (Cr), and alloys thereof. The external electrodes 231 and 232 may include at least one of, in detail, Ni and a Ni-alloy. Accordingly, connectivity to the internal electrodes 121 and 122 including Ni may be further improved.

As a more detailed example, the external electrodes 231 and 232 may include a first external electrode 231, including a first connection electrode 231a disposed on the third surface 3 and a first band electrode 231b extending from the first connection electrode 231a to a portion of the first surface 1, and a second external electrode 232 including a second connection electrode 232a disposed on the fourth surface 4 and a second band electrode 232b extending from the second connection electrode 232a to a portion of the first surface 1. The first connection electrode 231a may be connected to the first internal electrode 121 on the third surface 3, and the second connection electrode 232a may connected to the second internal electrode 122 on the fourth surface 4.

In this case, the connection electrodes 231a and 232a may include a conductive metal and a glass. The conductive metal may use a material having improved electrical conductivity as described above, and may include one or more of, for example, Cu, Ni, Pd, Ag, Sn, Cr, and alloys thereof, but exemplary embodiments are not limited thereto.

The first external electrode 231 may include a first band electrode 231b disposed on the first surface 1 to be connected to the first connection electrode 231a, and the second external electrode 232 may include a second band electrode 232b disposed on the first surface 1 to be connected to the second connection electrode 232a.

With a recent technological development of wearable devices and an increasing demand for the wearable devices in the field of information technology (IT), it is becoming important to guarantee bending strength. Accordingly, there is a need for an MLCC having a novel structure which may implement maximum capacitance within a limited volume to stably drive IT devices and may secure bending strength. In addition, to mount as many components as possible within a limited area of a substrate, it is necessary to significantly reduce a volume occupied by an electrode pad and a solder of the substrate. To this end, there have been attempts to significantly reduce a space by developing an L-shaped electrode, or the like. However, an L-shaped electrode, or the like, is vulnerable to external stress.

For this reason, according to an exemplary embodiment, a band electrode may include a resin, so that a multilayer electronic component highly resistant to external stress may be provided and a size thereof may be reduced.

For example, a resin may be included in the band electrode disposed on the first surface, so that stress may be applied to the multilayer electronic component by expansion and contraction of a solder during a solder reflow process. The resin included in the band electrode may alleviate such stress. In addition, the resin included in the band electrode may alleviate bending stress, which may be applied to the multilayer electronic component when a substrate is deformed, to prevent cracking or delamination from occurring.

The "solder reflow" refers to a process in which, when a lead paste is applied and then heat is applied, the lead paste surrounds the electrodes to dispose a multilayer electronic component and to simultaneously connect an electrode to an electrode. For example, the "solder reflow" is a process performed when mounting the multilayer electronic component.

When a multilayer electronic component according to an exemplary embodiment is mounted, the solder reflow may be performed at a reflow temperature ranging from 240° C. or more to 270° C. or less, but exemplary embodiments are not limited thereto. In general, when the reflow temperature is high, probability of occurrence of cracking of the multilayer electronic component is increased. This means that, as heating and cooling are performed during the reflow process, the greater a temperature difference, the higher stress applied to the multilayer electronic component. To address such an issue, a resin may be included in a band electrode to alleviate stress which may be applied to the multilayer electronic component, as will described below.

The band electrodes 231b and 232b may include a conductive metal and a resin. As the conductive metal, a material having improved electrical conductivity may also be used. The conductive metal may include at least one of, for example, Cu, Ni, Pd, Ag, Sn, Cr, and alloys thereof, but exemplary embodiments are not limited thereto.

The resin may include at least one selected from the group consisting of an epoxy resin, an acrylic resin, and ethyl cellulose, but exemplary embodiments are not limited thereto.

The above-mentioned resin may be included in the band electrode to alleviate stress which may be applied to a multilayer electronic component, and thus, cracking or delamination may be prevented from occurring. As a result, a multilayer electronic component resistant to bending stress and having improved reliability may be provided.

The insulating layers 251 and 252 may be disposed on the connection electrodes 231a and 232a.

As a more detailed example, the first insulating layer 251 may be disposed on the first connection electrode 231a, and the second insulating layer 252 may be disposed on the second connection electrode 232a.

Since the first and second connection electrodes 231a and 232a are portions connected to the internal electrodes 121 and 122, they may be a path through which a plating solution permeates in a plating process or moisture permeates during actual use. In the present disclosure, the insulating layers 251 and 252 may be disposed on the connection electrodes 231a and 232a to prevent permeation of external moisture or a plating solution.

The insulating layers 251 and 252 may be disposed to be in contact with the plating layers 241 and 242.

As a more detailed example, the first insulating layer 251 may be disposed to be in contact with the first plating layer 241, and the second insulating layer 252 may be disposed to be in contact with the second plating layer 242.

In this case, the first insulating layer 251 may be in contact with a portion of a distal end of the first plating layer 241 while covering the portion of the distal end, or the second insulating layer 252 may be in contact with a portion of a distal end of the second plating layer 242 while covering the portion of the distal end.

The insulating layers 251 and 252 may serve to prevent the plating layers 241 and 242 from being formed on the external electrodes 231 and 232 on which the insulating layers 251 and 252 are disposed, and may serve to improve sealing characteristics to significantly reduce permeation of external moisture, an external plating solution, or the like.

On the other hand, the first plating layer 241 may be in contact with a portion of a distal end of the first insulating layer while covering the portion of the distal end, or the second plating layer 242 may be in contact with a portion of a distal end of the second insulating layer 252 while covering the portion of the distal end.

Before the plating layers 241 and 242 are formed on the external electrodes 231 and 232, the insulating layers 251 and 252 may be formed to more reliably suppress the permeation of the plating solution during formation of a plating layer. For example, the insulating layers 251 and 252 may be formed before formation of the plating layers 241 and 242 to suppress the permeation of the plating solution, so that the plating layers 241 and 242 may have a shape covering the distal ends of the insulating layers 251 and 252.

In addition, when the laminated electronic component 2000 is mounted on a substrate (not illustrated), the insulating layers 251 and 252 may be formed on the external electrodes 231 and 232 to significantly reduce a mounting space.

The insulating layers 251 and 252 may include a resin and an additive.

The resin may be at least one selected from the group consisting of an epoxy resin, an acrylic resin, and ethyl cellulose, but exemplary embodiments are not limited thereto.

The additive may be at least one selected from the group consisting of $SiO_2$, $TiO_2$, $BaTiO_3$, $BaO$, $Al_2O_3$, and $ZnO$, but exemplary embodiments are not limited thereto.

An average thickness of the insulating layers 251 and 252 may be 500 nm or more and 1000 nm or less.

When the average thickness of the insulating layers 251 and 252 is less than 500 nm, the insulating layers 251 and 252 may not block moisture, so that moisture resistance reliability of the multilayer electronic component may not be secured. When the average thickness of the insulating layers 251 and 252 is greater than 1000 nm, it may be difficult to significantly reduce capacitance per unit volume of the multilayer electronic component because a proportion of the insulating layers 251 and 252 is excessive.

The average thickness of the insulating layers 251 and 252 may be an average of thickness values of the insulating layers 251 and 252 measured at a center point of the first and second connection electrodes 231a and 232a in the first direction, two points spaced apart from the center point by 5 μm, and two points spaced apart from the center point by 10 μm. In this case, the average thickness of the insulating layers 251 and 252 may refer to an average size thereof in the first direction.

The plating layers 241 and 242 may be disposed on the band electrodes 231b and 232b.

As a more detailed example, the first plating layer 241 may be disposed on the first band electrode 231b, and the second plating layer 242 may be disposed on the second band electrode 232b.

The plating layers 241 and 242 may serve to improve mounting characteristics. As the plating layers 241 and 242 are disposed on the band electrodes 231b and 232b, the mounting space may be significantly reduced and permeation of the plating solution into the internal electrode 121 and 122 may be significantly reduced to improve reliability. One distal end of the first plating layer 241 may be in contact with the first surface 1, and the other distal end thereof may be in contact with the first insulating layer 251. One distal end of the second plating layer 242 may be in contact with the first surface 1, and the other distal end thereof may be in contact with the second insulating layer 252. Such a continuous structure of the continuous plating layers 241 and 242 may be helpful in reducing equivalent series resistance (ESR) of the multilayer electronic component.

The type of the plating layers 241 and 242 does not need to be limited, and each of the plating layers 241 and 242 may be a plating layer including at least one of Cu, Ni, Sn, Ag, Au, Pd, and alloys thereof and may include a plurality of layers.

As a more detailed example of the plating layers 241 and 242, the plating layers 241 and 242 may be a Ni-plating layer or a Sn-plating layer, and may be in a form in which a Ni-plating layer and a Sn-plating layer are sequentially formed on the first and second band electrodes 231b and 232b.

In an exemplary embodiment, the first insulating layer 251 may disposed to cover a distal end of the first plating layer 241 disposed on the first external electrode 231, and the second insulating layer 242 may be disposed to cover a distal end of the second plating layer 242 disposed on the external electrode 232.

Before the plating layers 241 and 242 are formed on the external electrodes 231 and 232, insulating layers 251 and 252 may be formed to more reliably suppress permeation of the plating solution during formation of a plating layer. In addition, bonding force between the insulating layers 251 and 252 and the plating layers 241 and 242 may be increased to improve the reliability of the multilayer electronic component.

Referring to FIG. 5, the plating layers 241 and 242 of the multilayer electronic component 2000 may be bonded to the electrode pads 181 and 182 disposed on a substrate (not shown) by solders 191 and 192.

In an exemplary embodiment, H2≤H1, where H1 is an average size to an internal electrode, disposed to be closest to the first surface 1 in the first direction, among the first and second internal electrodes 121 and 122, and H2 is an average size from an extension line of the first surface 1 to distal ends of the first and second plating layers 241 and 242, disposed on the first and second connection electrodes 231a and 232a, in the first direction.

Accordingly, solders 191 and 192 required to mount the multilayer electronic component 2000 on the substrate may be significantly reduced, so that a mounting space may be reduced, a purpose of reducing ESR, a purpose of the multilayer electronic component 2000, may be achieved, and permeation of a plating solution into the internal electrodes 121 and 122 during a plating process may be suppressed to improve reliability.

Each of H1 and H2 may be an average of values measured in a cross-section (an L-T cross-section) of a body 110, taken in the first and second directions (thickness and length directions), at five (5) points equally spaced apart from each other in a third direction (a width direction). H1 may be an average of values measured at points, at which an internal electrode disposed to be closest to the first surface 1 is connected to an external electrode, in respective cross-sections. H2 may be an average of values measured based on distal ends of the plating layers 241 and 242 in contact with the external electrode. Extension lines of the first surface, a reference for measurement of H1 and H2, may be the same.

Hereinafter, a multilayer electronic component 2001 according to an exemplary embodiment will be described with reference to FIGS. 6 to 8.

Referring to FIGS. 6 and 7, the multilayer electronic component 2001 according to an exemplary embodiment may include first and second plating layers 241-1 and 242-1 formed on a level the same as or lower than a level of an extension line E1 of a first surface.

Accordingly, referring to FIG. 8, heights of the solders 191-1 and 192-1 may be decreased during mounting, and spaces of the electrode pads 181-1 and 182-1 may be reduced to significantly reduce a mounting space.

In addition, insulating layers 251-1 and 252-1 may extend to a portion, disposed on a level the same as or lower than a level of the extension line E1 of the first surface, to be in contact with the first and second plating layers 241-1 and 242-1.

Hereinafter, a multilayer electronic component 2002 according to an exemplary embodiment will be described with reference to FIGS. 9 to 11.

Referring to FIGS. 9 and 10, in the laminated electronic component 2002 according to an embodiment of the present invention, H2>H1, where H1 is an average size to an internal electrode, disposed to be closest to a first surface 1 in a first direction, among first and second internal electrodes 121 and 122, and H2 is an average size from an extension line E1 of the first line 1 to distal ends of first and second plating layers 241-1 and 242-2, disposed on first and second connection electrodes 231a and 232a, in the first direction.

Accordingly, referring to FIG. 11, when a mounting space does not need to be reduced, first and second insulating layers 251-2 and 252-2 may be significantly reduced to decrease ESR and a multilayer electronic component 2002 according to an exemplary embodiment is effective in achieving the purpose when low ESR is required.

Each of H1 and H2 may be an average of values measured in a cross-section (an L-T cross-section) of a body 110, taken in first and second directions (thickness and length directions), at five (5) points equally spaced apart from each other in a third direction (a width direction). H1 may be an average of values measured at points, at which an internal electrode disposed to be closest to the first surface 1 is connected to an external electrode, in respective cross-sections. H2 may be an average of values measured based on distal ends of the plating layers 241-1 and 242-2 respectively in contact with the first and second insulating layers 251-2 and 252-2. Extension lines of the first surface, a reference for measurement of H1 and H2, may be the same.

Referring to FIGS. 18 to 20, a multilayer electronic component 2006 according to an exemplary embodiment may include a body including a plurality of dielectric layers 111 and first and second internal electrodes 121 and 122 disposed alternately with the dielectric layers 111 in a first direction and having first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction, a first external electrode 231 including a first connection electrode 231a disposed on the third surface 3 and a first band electrode 231b disposed on the first surface 1 to be connected to the first connection electrode 231a, a second external electrode 232 including a second connection electrode 232a disposed on the fourth surface 4 and a second band electrode 232b disposed on the second surface 2 to be connected to the second connection electrode 232a, a first plating layer 241-3 disposed on the first external electrode 231, and a second plating layer 242-3 disposed on the second external electrode 232. The first and second band electrodes 231b and 232b may include a conductive metal and a resin.

In the multilayer electronic component 2006, descriptions of the same configurations as described above will be omitted.

Referring to FIGS. 18 and 19, plating layers 241-3 and 242-3 may be disposed to cover the entire external electrodes 231 and 232, so that the insulating layers 251 and 252 may not be formed.

Accordingly, referring to FIG. 20, when a mounting space does not need to be reduced, the purpose may be achieved in the case in which minimum ESR is required.

Hereinafter, a multilayer electronic component 2003 according to an exemplary embodiment will be described with reference to FIGS. 12 and 13.

According to the multilayer electronic component 2003, the first external electrode 231 may further include a third connection electrode 231c disposed on the third surface 3 to be disposed on the first connection electrode 231a, the second external electrode 232 may further include a fourth connection electrode 232c disposed on the fourth surface 4 to be disposed on the second connection electrode 232a, the first insulating layer 251 may be disposed on the third connection electrode 232c, and the second insulating layer 252 may be disposed on the fourth connection electrode 232c.

The third and fourth connection electrodes 231c and 232c may include a conductive metal. The conductive metal may be at least one of Cu, Ni, Pd, Ag, Sn, Cr, and alloys thereof. As described above, the third and fourth connection electrodes 231c and 232c may be formed of any material as long as it has electrical conductivity, and a specific material may be determined in consideration of electrical characteristics, structural stability, and the like.

In this case, main components referring to components, included in a largest amount, of the conductive metal included in the first connection electrode 231a and the third connection electrode 231c, may be different from each other. Similarly, main components of the conductive metal included in the second connection electrode 232a and the fourth connection electrode 232c may be different from each other.

The third connection electrode 231c disposed on the first connection electrode 231a and the fourth connection electrode 232c disposed on the second connection electrode 232a may include glass, but exemplary embodiments are not limited thereto.

The third and fourth connection electrodes 231c and 232c may be applied to all of the multilayer electronic components 2000, 2001, 2002, 2004, 2005, and 2006 described herein, as necessary.

Hereinafter, multilayer electronic components 2004 and 2005 according to an exemplary embodiment will be described with reference to FIGS. 14 to 17.

Referring to FIGS. 14 and 15, the multilayer electronic component 2004 according to an exemplary embodiment may further include an additional insulating layer 261 disposed on a first surface and disposed between a first band electrode 231b and a second band electrode 232b.

As plating layers 241 and 242 and insulating layers 251 and 252 are disposed on external electrodes 231 and 232, the amount of solders 181 and 182 may be insufficient, so that bonding force to a substrate (not illustrated) may be reduced. In this case, to secure adhesion strength of the multilayer electronic component, the first and second band electrodes 231b and 232b in a second direction (a length direction) may be formed to have a significantly large size, so that an area in which the multilayer electronic component 2004 is connected to the solder 181 and 182 may be significantly increased to supplement the improvement of the adhesion strength.

In this case, since a distance between the band electrodes 231b and 232b or the plating layers 241 and 242 is too close under a high-voltage operating condition, insulation breakdown may occur. To prevent the insulation breakdown from occurring, an additional insulating layer 261 may be formed between the first and second band electrodes 231b and 232b to prevent leakage current, or the like.

Referring to FIGS. 16 and 17, a multilayer electronic component 2005 according to an exemplary embodiment may further include an additional insulating layer 261-1 disposed on a first surface 1, and first and second band electrodes 231b and 232b may be disposed on the additional insulating layer 261-1.

The additional insulating layer 261-1 may alleviate stress transmitted to the multilayer electronic component 2005 through the first and second band electrodes 231b and 232b, and may reduce vibration generated from the multilayer electronic component 2005 and increase a distance between a substrate (not illustrated) and the multilayer electronic component 2005 to significantly reduce acoustic noise.

The additional insulating layers 261 and 261-1 may include a resin and an additive, but do not need to have the same composition as those included in the first and second insulating layers 251 and 252 and may have a composition, different from a composition of those included in the first and second insulating layers 251 and 252.

In this case, the resin included in the additional insulating layers 261 and 261-1 may include at least one selected from an epoxy resin, an acrylic resin, and ethyl cellulose, and the additive included in the additional insulating layers 261 and 261-1 may include at least one selected from $SiO_2$, $TiO_2$, $BaTiO_3$, BaO, $Al_2O_3$, and ZnO.

The additional insulating layers 261 and 261-1 may be applied to all of the multilayer electronic components 2000, 2001, 2002, and 2003 described herein, as necessary.

Sizes of the multilayer electronic components 2000, 2001, 2002, 2003, 2004, 2005, and 2006 do not need to be limited. To simultaneously achieve miniaturization and high capacitance, the number of laminated layers should be increased by reducing the thicknesses of dielectric layers and internal electrodes. Therefore, an effect of improving reliability and capacitance per unit volume may be more prominent in a multilayer electronic component having a size of 1005 (length×width, 1.0 mm×0.5 mm) or less.

Hereinafter, the present disclosure will be described in detail through experimental examples, but the experimental examples are to help the specific understanding of the present disclosure. Therefore, the scope of the present disclosure is not limited thereto.

EXPERIMENTAL EXAMPLE

When a band electrode including a resin is formed in a multilayer electronic component 2000, stress applied to the multilayer electronic component 2000 during a reflow process or deformation of a substrate may be alleviated. Hereinafter, this will be described through experimental examples. In the present embodiment, data evaluated for the multilayer electronic component 2000 are summarized and listed in tables, but an effect of enhancing bending stress by forming a band electrode including a resin, or the like, is not limited in only the present embodiment 2000. In addition, an effect of enhancing bending stress to be described later, or the like, may be exhibited in all cases in which a band electrode including a resin is provided as a configuration.

Tables 1 to 3 are made by evaluating whether stress was alleviated by measuring whether cracking has occurred during a reflow process or deformation of a substrate of the multilayer electronic component 2000 including a band electrode including a resin.

The presence or absence of cracking was confirmed through a scanning electron microscope (SEM), and accurate measurement positions are as follows. A region of a straight line in a first direction (a thickness direction) was confirmed at points spaced apart by ¼, 2/4, and ¾ and a region of a straight line in a third direction (a width direction) was confirmed at points spaced apart by ¼, 2/4, and ¾ in a cross-section (a W-T cross-section) taken in the first and third directions (thickness-width directions), based on a region between opposite distal ends of the first and second internal electrodes and a boundary surface of a body. In the case in which cracking occurred in a corresponding region, the case was determined to be defective.

Inventive Examples 1 to 3 correspond to multilayer electronic components (chips) in which a band electrode including a resin is formed. In this case, a conductive metal included in the band electrode was copper (Cu) and the resin was epoxy.

Comparative Examples 1 to 3 correspond to a case in which a band electrode was formed as a sintering electrode including a conductive metal and a glass without including a resin. Similarly, the conductive metal was Cu.

Table 1 illustrates evaluation of the degree of alleviation of stress applied during a reflow process. In a detailed evaluation method, 10 chips were mounted on a substrate and were then heated at 270° C., a harsh temperature condition, and naturally cooled to reflow. In this case, the heating and the natural cooling were repeated five times. Then, hot air was applied to the chips mounted on the substrate to remove the chips therefrom, and a determination was made as to whether cracking occurred in the above-mentioned region, through a SEM.

TABLE 1

| Classification | Frequency of Cracking |
|---|---|
| Comparative Example 1 | 10/10 |
| Inventive Example 1 | 0/10 |

In Comparative Example 1, an external electrode, including a band electrode which does not include a resin, was formed, so that cracking occurred in all of the ten chips due to stress applied during the reflow. Therefore, it may be evaluated that the stress applied to the chip were not reduced.

On the other hand, in Example 1, cracking did not occur in all of the ten chips. Accordingly, it may be evaluated that the stress applied to the chip was alleviated by a band electrode including a resin.

Table 2 illustrates evaluation of the degree of alleviation of stress during deformation of a multilayer electronic component. According to a detailed evaluation method, ten chips were mounted on a substrate, and 4 mm of deformation was then applied to the substrate. Then, hot air was applied to the chips mounted on the substrate to remove the chips therefrom, and a determination was made as to whether cracking occurred in the above-mentioned region, through a SEM.

TABLE 2

| Classification | Frequency of Cracking |
|---|---|
| Comparative Example 2 | 3/10 |
| Inventive Example 2 | 0/10 |

In Comparative Example 2, it may be confirmed that a band electrode which did not include a resin was formed, so that cracking occurred in three chips, among the ten chips, due to stress generated when 4 mm of deformation was applied once.

On the other hand, in Inventive Example 2, cracking did not occur in all of the ten chips. Accordingly, it may be evaluated that stress was alleviated even when deformation was applied to a chip by a band electrode including a resin.

Table 3 illustrates the degree of alleviation of bending stress through a moisture resistance reliability evaluation (8585 test). According to a detailed evaluation method, 66 chips were mounted on a substrate, and deformation of 4 mm was applied the substrate five times. Then, a voltage of 1 VR was applied to the chip for 24 hours under conditions of a temperature of 85° C. and relative humidity of 85%. In the case in which insulation resistance was decreased by more than 1/100 as compared to the initial insulation resistance, a defect caused by IR deterioration was determined to occur.

TABLE 3

| Classification | Frequency of Cracking |
|---|---|
| Comparative Example 3 | 11/66 |
| Inventive Example 3 | 0/66 |

In comparative Example 3, it may be confirmed that a band electrode which did not include a resin was formed, so that an IR deterioration defect occurred in eleven (11) chip, among the 66 chips, when 4 mm of deformation was applied five times. From this, it may be confirmed that moisture resistance reliability was not improved and stress applied to a chip was not reduced.

On the other hand, in Inventive Example 3, it may be confirmed that a band which did not include a resin was formed, so that there was no chip in which an IR deterioration defect occurred, among the 66 chips, even when 4 mm of deformation was applied. From this, it may be confirmed that moisture resistance reliability was improved, and stress applied to a chip was alleviated by a band electrode including a resin.

As described above, a band electrode, including a conductive metal and a resin, may be included to alleviate stress which may be applied to a multilayer electronic component during reflow or deformation of a substrate.

In addition, an insulating layer may be disposed on a connection electrode of an external electrode and a plating layer may be disposed on a band electrode of the external electrode, thereby improving reliability of a multilayer electronic component while increasing capacitance per unit volume of the multilayer electronic component.

In addition, a mounting space of a multilayer electronic component may be significantly reduced.

In addition, ESR or acoustic noise may be reduced.

While example embodiments have been shown and described above, it will be apparent to those skilled in the art that modifications and variations could be made without departing from the scope of the present invention as defined by the appended claims.

What is claimed is:

1. A multilayer electronic component comprising:
a body including a plurality of dielectric layers and first and second internal electrodes disposed alternately with the dielectric layers in a first direction and having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode including a first connection electrode, disposed on the third surface, and a first band electrode disposed on the first surface to be connected to the first connection electrode;
a second external electrode including a second connection electrode, disposed on the fourth surface, and a second band electrode disposed on the first surface to be connected to the second connection electrode;
a first insulating layer disposed on the first connection electrode;
a second insulating layer disposed on the second connection electrode;
a first plating layer disposed on the first band electrode; and
a second plating layer disposed on the second band electrode,
wherein the first and second band electrodes include a conductive metal and a resin,
wherein at least one of the second surface, fifth surface or sixth surface is devoid of at least one of the first external electrode or the second external electrode, and
wherein a material of the first connection electrode is different from a material of the first band electrode, or a material of the second connection electrode is different from a material of the second band electrode.

2. The multilayer electronic component of claim 1, wherein
the resin includes at least one selected from the group consisting of an epoxy resin, an acrylic resin, and ethyl cellulose.

3. The multilayer electronic component of claim 1, wherein
the conductive metal includes at least one of copper (Cu), nickel (Ni), silver (Ag), tin (Sn), or chromium (Cr).

4. The multilayer electronic component of claim 1, wherein
the first insulating layer is disposed to cover a distal end of the first plating layer disposed on the first external electrode, and
the second insulating layer is disposed to cover a distal end of the second plating layer disposed on the second external electrode.

5. The multilayer electronic component of claim 1, wherein
H2≤H1, where H1 is an average size to an internal electrode, disposed to be closest to the first surface in the first direction, among the first and second internal electrodes, and H2 is an average size from an extension line of the first surface to distal ends of the first and second plating layers, disposed on the first and second connection electrodes, in the first direction.

6. The multilayer electronic component of claim 1, wherein
the first and second plating layers are disposed on a level the same or lower than a level of an extension line of the first surface.

7. The multilayer electronic component of claim 1, wherein
H2>H1, where H1 is an average size to an internal electrode, disposed to be closest to the first surface in the first direction, among the first and second internal electrodes, and H2 is an average size from an extension line of the first surface to distal ends of the first and second plating layers, disposed on the first and second connection electrodes, in the first direction.

8. The multilayer electronic component of claim 1, wherein
the first external electrode further includes a third connection electrode disposed on the third surface to be disposed on the first connection electrode,
the second external electrode further includes a fourth connection electrode disposed on the fourth surface to be disposed on the second connection electrode,
the first insulating layer is disposed on the third connection electrode, and
the second insulating layer is disposed on the fourth connection electrode.

9. The multilayer electronic component of claim 1, further comprising:
an additional insulating layer disposed on the first surface and disposed between the first band electrode and the second band electrode.

10. The multilayer electronic component of claim 9, wherein
the additional insulating layer includes a resin and an additive.

11. The multilayer electronic component of claim 10, wherein
the resin, included in the additional insulting layer, includes at least one selected from the group consisting of an epoxy resin, an acrylic resin, and ethyl cellulose.

12. The multilayer electronic component of claim 10, wherein
the additive, included in the additional insulating layer, includes at least one selected from the group consisting of $SiO_2$, $TiO_2$, $BaTiO_3$, $BaO$, $Al_2O_3$, and $ZnO$.

13. The multilayer electronic component of claim 1, further comprising:
an additional insulating layer disposed on the first surface,
wherein the first and second band electrodes are disposed on the additional insulating layer.

14. The multilayer electronic component of claim 13, wherein
the additional insulating layer includes a resin and an additive.

15. The multilayer electronic component of claim 14, wherein
the resin, included in the additional insulting layer, includes at least one selected from the group consisting of an epoxy resin, an acrylic resin, and ethyl cellulose.

16. The multilayer electronic component of claim 14, wherein
the additive, included in the additional insulating layer, includes at least one selected from the group consisting of $SiO_2$, $TiO_2$, $BaTiO_3$, $BaO$, $Al_2O_3$, and $ZnO$.

17. The multilayer electronic component of claim 1, further comprising:
a margin portion disposed on opposite end surfaces of the body in the third direction,
wherein the body includes an active portion, including the first and second internal electrodes disposed alternately with the plurality of dielectric layers in the first direction, and a cover portion disposed on opposite end surfaces of the active portion in the first direction.

18. A multilayer electronic component comprising:
a body including a plurality of dielectric layers and first and second internal electrodes disposed alternately with the dielectric layers in a first direction and having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode including a first connection electrode, disposed on the third surface, and a first band electrode disposed on the first surface to be connected to the first connection electrode;
a second external electrode including a second connection electrode, disposed on the fourth surface, and a second band electrode disposed on the first surface to be connected to the second connection electrode;
a first plating layer disposed on the first external electrode; and
a second plating layer disposed on the second external electrode,
wherein the first and second band electrodes include a conductive metal and a resin,
wherein at least one of the second surface, fifth surface or sixth surface is devoid of at least one of the first external electrode or the second external electrode, and
wherein a material of the first connection electrode is different from a material of the first band electrode, or a material of the second connection electrode is different from a material of the second band electrode.

* * * * *